Oct. 15, 1963  L. W. MALZAHN ETAL  3,107,019
APPARATUS FOR LOADING ARTICLES ONTO CONVEYORS
Filed Aug. 10, 1960  3 Sheets-Sheet 3

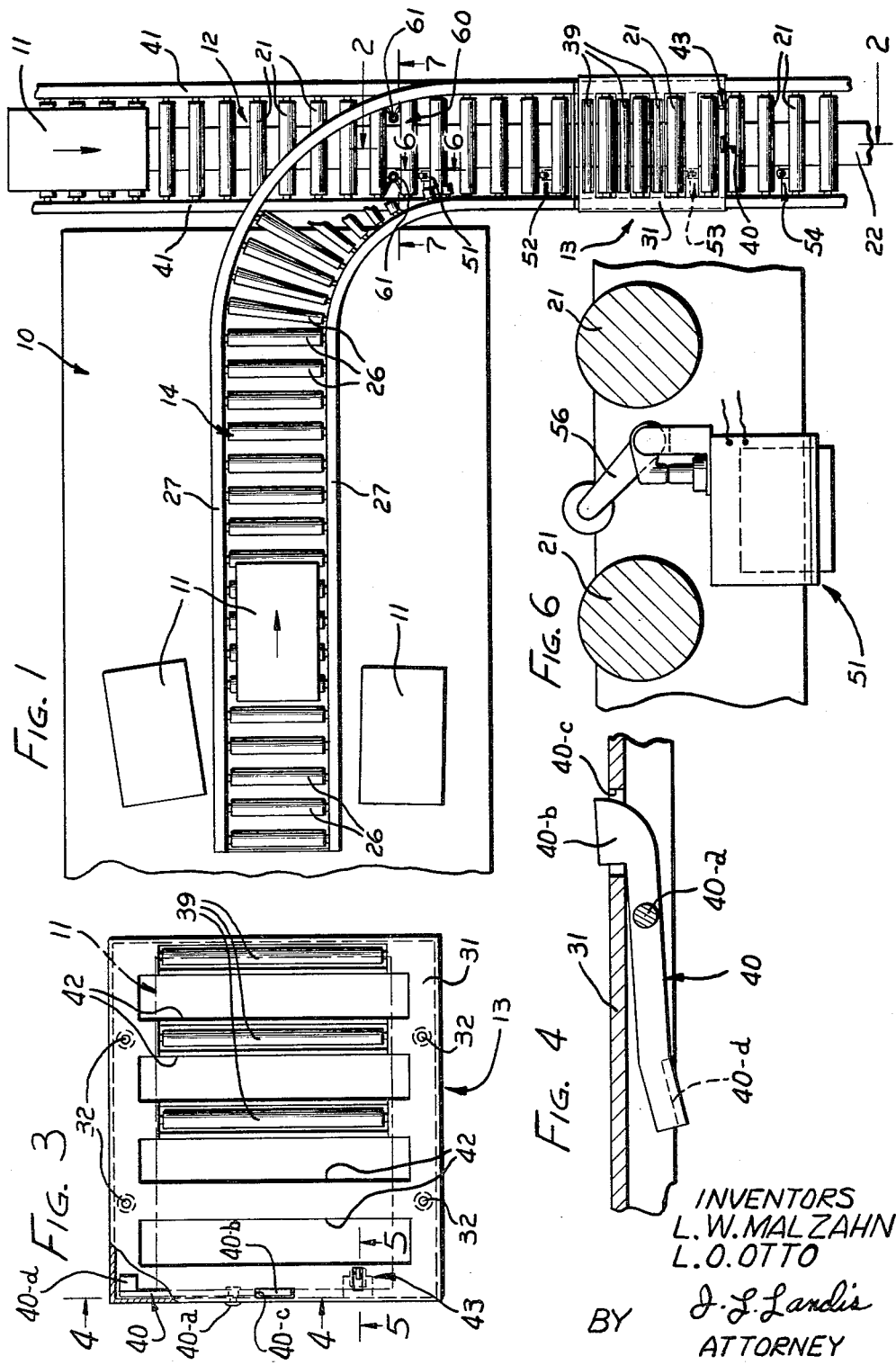

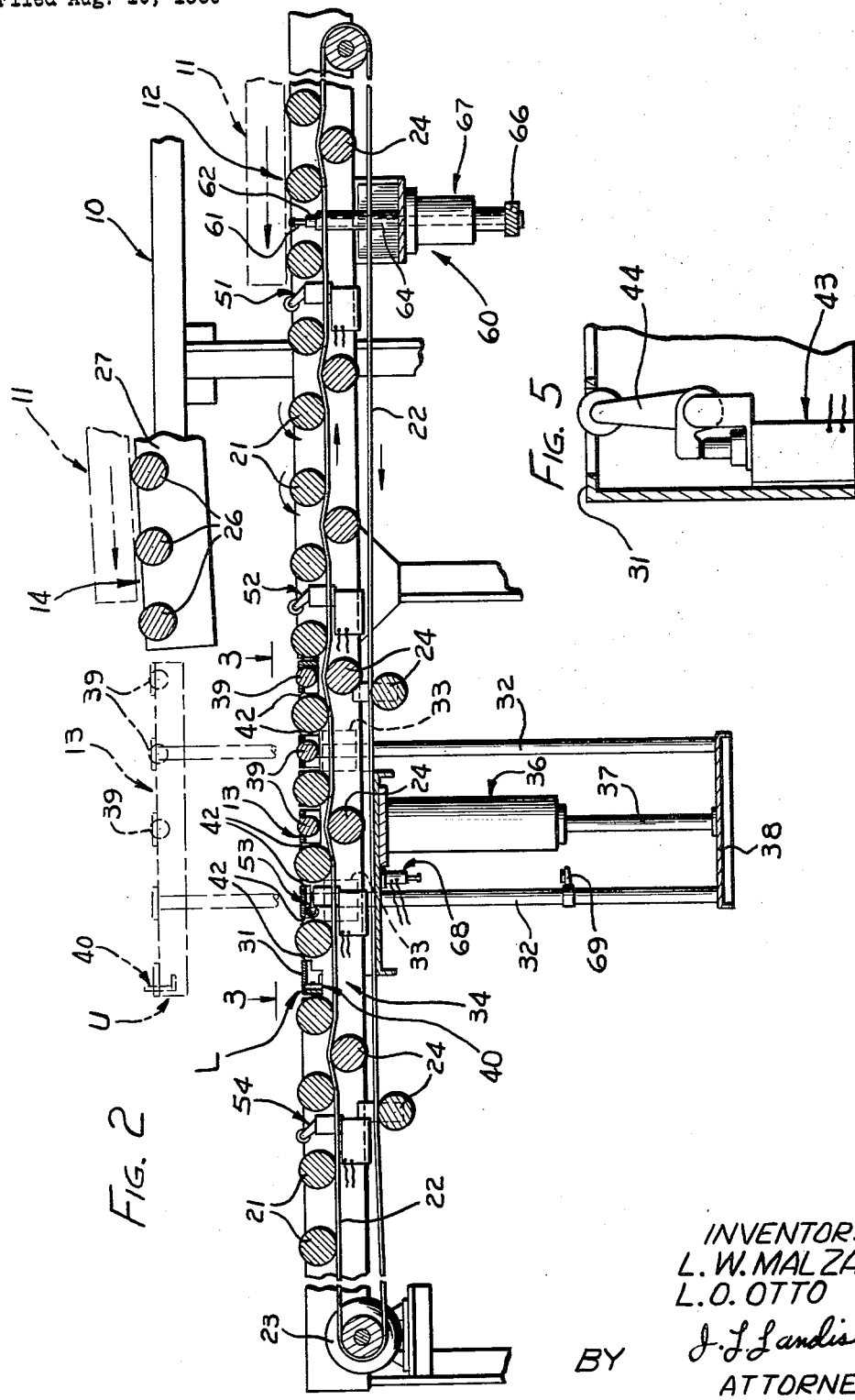

INVENTORS
L. W. MALZAHN
L. O. OTTO
BY J. L. Landis
ATTORNEY

United States Patent Office 3,107,019
Patented Oct. 15, 1963

3,107,019
APPARATUS FOR LOADING ARTICLES ONTO
CONVEYORS
Lester W. Malzahn, Melrose Park, and Leslie O. Otto,
Elmhurst, Ill., assignors to Western Electric Company,
Incorporated, New York, N.Y., a corporation of New
York
Filed Aug. 10, 1960, Ser. No. 48,693
7 Claims. (Cl. 214—89)

The present invention relates generally to apparatus for loading articles onto conveyors, and more particularly to apparatus for transferring articles from a plurality of work stations to a continuously-running main conveyor that passes below all of the work stations.

Accordingly, a general object of the invention is to provide new and improved apparatus for loading articles onto conveyors.

A more specific object of the invention is to provide new and improved apparatus for transferring articles from a plurality of work stations to a continuously-running main conveyor that passes below all of the work stations.

In the manufacture and assembly of various piece parts, such as relays for step-by-step switches used in the telephone industry, it is common practice to provide a plurality of operationally parallel work stations, at which the same assembly operation is performed by various persons. When the assemblies are complete, it is convenient to provide a discharge conveyor at each work station that leads to a common main conveyor for transporting all of the articles to further operating stations or to storage.

Another object of the invention is to provide apparatus for transferring articles from each of a plurality of operationally parallel work stations to a continuously-running main conveyor, which has spaced driven rolls and which services all of the work stations.

Another object of the invention is to provide such a transfer apparatus wherein the transfer operation is delayed, where necessary, until the main conveyor is cleared of all articles which would otherwise interfere with the transfer operation.

A related object of the invention is to provide such a transfer apparatus wherein the advancement of any additional article along the main conveyor beyond a point where it would interfere with an elevator member during a transfer operation is precluded.

Still another object of the invention is to provide new and improved stopping mechanisms for temporarily precluding the advancement of articles along a conveyor having spaced driven rolls beyond a predetermined point.

Another object of the invention is to provide such a stopping apparatus using extensible stopping rods, with a provision whereby the stopping rods will not interfere with articles on the conveyor in the event that a stopping rod is extended at a time when an article overlies the stopping rod.

With the foregoing and other objects in view, an apparatus according to the invention for loading articles onto a conveyor having spaced driven rolls may include an elevator having a platform designed for receiving articles thereon. The platform is normally positioned above the conveyor rolls, and is provided with spaced apertures therealong which are larger than the conveyor rolls and are directly aligned thereabove. A mechanism is also provided for lowering the elevator from an uppermost receiving position to a lowermost transferring position where the apertures fit over the aligned conveyor rolls and the upper surface of the platform lies below the upper surface of the conveyor rolls, so that articles on the platform are deposited on the conveyor rolls for advancement thereby.

According to other aspects of the invention, using one or more elevators to transfer articles to a continuously-running conveyor therebeneath, one or more of the following control devices are provided: (1) a control device, actuated by the reception of an article on the elevator, for initiating operation of the elevator-lowering mechanism; (2) a control device, responsive to the presence of any article that is already on the conveyor and is in a position where it would otherwise interfere with the transfer operation, for precluding the operation of the elevator-lowering mechanism until after all such potentially itnerfering articles on the conveyor passed the elevator; and (3) a control device, actuated when an article is received on the elevator prior to the start of a transfer operation, for operating a stopping mechanism designed for precluding the advancement of any additional article along the conveyor beyond a point where it would interfere with the elevator during the transfer operation.

An illustrative apparatus for temporarily precluding the advancement of articles along a conveyor having spaced driven rolls, particularly for precluding advancement beyond a predetermined point as recited in the preceding paragraph, may include a stopping rod located at the predetermined point and movable in the space between two conveyor rolls. A tubular shaft is provided for receiving the stopping rod at the upper end thereof, together with a compression spring received in the tubular shaft for biasing the stopping rod upward to a protruding position with respect to the tubular shaft. A device is provided for moving the tubular shaft between a retracted position where the stopping rod lies entirely below the upper surfaces of the conveyor rolls and an extended position where that portion of the stopping rod which protrudes from the tubular shaft extends above the upper surfaces of the conveyor rolls so as to stop the advancement of articles therealong. With this arrangement, the stopping rod is depressed by an article to a noninterfering position within the tubular shaft in the event that the tubular shaft is moved to the extended position at a time when an article overlies the stopping rod.

Other objects, advantages and aspects of the invention will become apparent from the following detailed description of a specific embodiment thereof, when taken in conjunction with the appended drawings, in which:

FIG. 1 is a top plan view of one portion of a conveyor-loading apparatus in accordance with the invention;

FIG. 2 is an enlarged vertical section of a portion of the apparatus illustrated in FIG. 1, taken generally along the line 2—2 of FIG. 1 in the direction of the arrows;

FIG. 3 is a detail plan view of an elevator in accordance with the invention, taken generally along the line 3—3 of FIG. 2 in the direction of the arrows;

FIG. 4 is a fragmentary vertical section, taken generally along the line 4—4 of FIG. 3 and illustrating a mechanism for stopping articles in a fixed position atop the elevator;

FIG. 5 is a fragmentary vertical section, taken generally along the line 5—5 of FIG. 3 and illustrating a limit switch which is responsive to the reception of an article on the elevator illustrated in FIG. 3;

FIG. 6 is an enlarged fragmentary vertical section, taken generally along the line 6—6 of FIG. 1 and illustrating one of several similar article-sensitive limit switches that are associated with a main conveyor;

Figure 7:
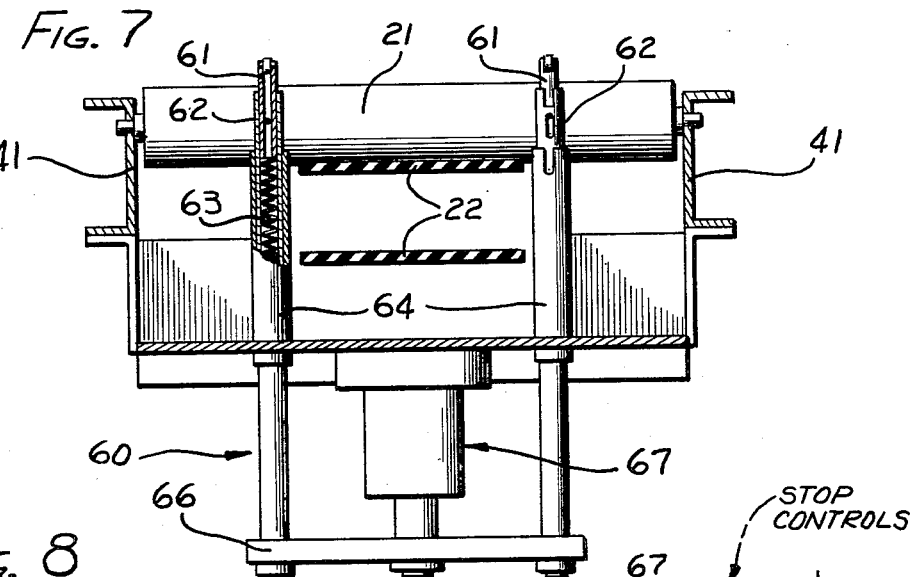
FIG. 7 is an enlarged vertical section, taken generally along the line 7—7 of FIG. 1 and illustrating a stopping mechanism in accordance with the invention.

Referring now in detail to the drawings and in particular to FIGS. 1 and 2, one typical work station 10 (out of a plurality of similar, operationally parallel work stations) is illustrated, from which a succession of articles 11—11 are to be transferred to a continuously-running main conveyor 12. One or more assembling or other manufacturing operations are performed by various personnel situated at the work stations 10—10, for example the assembly of relays to be used in step-by-step switches. In that example, the articles 11—11 represent pans or carriers, in which the assembled relays are placed and which are to be loaded onto the main conveyor 12 when full for transportation to further operating stations or to storage.

As best illustrated in FIG. 2, the main conveyor 12 passes below each work station 10. An elevator 13 is associated with each work station 10 for receiving the articles 11—11 from a gravity conveyor 14 connecting each work station 10 to the associated elevator 13 and for lowering the articles 11—11 onto the main conveyor 12. With this arrangement, the articles 11—11 produced at all of the work stations 10—10 are transferred by the elevators 13—13 to the common main conveyor 12, and are thereafter carried away by the main conveyor 12, from right to left as viewed in FIG. 2.

According to the specific embodiment illustrated, the main conveyor 12 consists of a plurality of rotatable rolls 21—21, which are spaced much more closely than the length of the articles 11—11 so as to support the articles thereon. The rolls 21—21 are continuously driven by a travelling belt 22 so as to advance the articles 11—11 therealong. As illustrated in FIG. 2, an upper or operative run of the belt 22 advances from left to right in pressing engagement with the under surfaces of the conveyor rolls 21—21 so as to rotate the rolls frictionally in a counterclockwise direction to advance the articles 11—11 from right to left. The belt 22 is driven by a motor 23, and a plurality of idler rolls 24—24 are provided, which are arranged as illustrated to guide and tension the belt 22.

The gravity conveyor 14 is of a generally conventional type, which includes a plurality of idler rolls 26—26 that are mounted on an incline, as viewed in FIG. 2, so as to advance each article 11 placed thereon between a pair of guide rails 27—27 to a rest position atop the elevator 13. The elevator 13 is normally positioned at an uppermost or receiving position U, shown in phantom lines in FIG. 2, where the upper surface thereof aligns with the gravity conveyor 14 so as to receive the articles 11—11 on the upper surface thereof. The idler rolls 26—26 of the gravity conveyor 14 have been broken away beginning with those at a curved section at the right of FIG. 1, so as to show the rolls 21—21 of the main conveyor 12 passing therebeneath in order to reveal the location of certain switching and stopping mechanisms associated with the main conveyor 12.

The elevator 13 includes a platform 31, that is designed for receiving the articles 11—11 thereon in the general position indicated in FIG. 3. The platform 31 is mounted for vertical movement on four rods 32—32, which are supported for sliding movement within a set of four Teflon bushings 33—33. The bushings 33—33 are in turn secured to a main supporting structure designated generally by the numeral 34. The elevator 13 is raised and lowered by means of an air cylinder 36 (FIG. 2) having a piston rod 37 that is secured to a plate 38, which plate is also secured to the lower ends of the four mounting rods 32—32.

A set of three idler rolls 39—39 is provided at the right side (FIGS. 2 and 3) of the platform 31. The rolls 39—39 project above the upper surface of the platform 31 so as to facilitate the transfer of the articles 11—11 from the gravity conveyor 14 to a rest position entirely on the upper surface of the platform 31.

A pivoted stopping bar is provided, which is designated generally by the numeral 40 and is best illustrated in FIGS. 3 and 4. In FIG. 4, the bar 40 is illustrated in a stopping position which it assumes whenever the elevator platform 31 is in the uppermost or article-receiving position U. In the stopping position, the bar is pivoted by gravity a maximum amount in a counterclockwise direction about a pivot pin 40–a that is mounted close to an enlarged flat right end portion 40–b of the bar 40. In this position, the end portion 40–b projects through a slot 40–c in the elevator platform 31 a sufficient distance to stop an article 11 in the rest position illustrated in phantom lines in FIG. 3.

The air cylinder 36 is normally operated so as to raise and hold the platform 31 at the uppermost position U, where it is ready to receive an article 11 from the gravity conveyor 14. After an article 11 has been so received on the platform 31, the air cylinder is operated by control mechanisms to be described hereinafter to lower the platform 31 to a lowermost or transferring position L, shown in solid lines in FIG. 2. In the lowermost position L, the upper surfaces of the platform 31 and the idler rolls 39—39 lie entirely below the upper surfaces of the main conveyor rolls 21—21, so that an article 11 on the platform 31 is deposited on the main conveyor rolls 21—21 for advancement thereby to the left as viewed in FIG. 3. As the elevator platform 31 descends, a flat projection 40–d at the left end of the stopping bar 40 strikes a side rail 41 (FIG. 1) of the main conveyor 12 so as to pivot the bar 40 in a clockwise direction, as viewed in FIG. 4, so as to retract the end 40–b of the stopping rod 40 to a noninterfering position below the level of the elevator platform 31. When the article 11 has been advanced by the main conveyor 12 to an advanced position where it no longer overlies the platform 31, the air cylinder 36 is again actuated so as to raise the platform 31 back to the uppermost position U in preparation for a subsequent transfer operation.

In order to make possible such a transfer operation, the platform 31 is provided with a group of four spaced apertures 42—42 which are larger than the main conveyor rolls 21—21 and are directly aligned thereabove when the platform 31 is in the uppermost position U. When the platform 31 is lowered to the lowermost position L, the apertures 42—42 fit over the aligned conveyor rolls 21—21, as illustrated in FIG. 2, to permit the lowering of the platform 31 below the level of the main conveyor rolls 21—21. The idler rolls 39—39 on the elevator 13 are located between the slots 42—42 so as to nest between adjacent pairs of main conveyor rolls 21—21. As clearly illustrated in FIG. 2, the platform 31 is sufficiently thin to permit the lowering operation without the platform 31 making contact with the belt 22.

In order to provide for automatic operation, a first control device is provided, which is actuated when an article 11 is received on the platform 31, for initiating operation of the air cylinder 36 to lower the elevator 13. Such a control device is illustrated mechanically in FIG. 5, and comprises a limit switch, designated generally by the numeral 43, having a normally open contact 43–a and a normally closed contact 43–b illustrated in FIG. 8. With the arrangement shown in FIG. 5, the limit switch 43 is mounted near the left end of the platform 31 so as not to be actuated until the article 11 comes to the rest position thereon, and has an actuator arm 44 that extends above the upper surface of the platform 31 so as to be depressed by an article 11 as it comes to the rest position on the platform 31 prior to each transfer operation. As will be discussed in detail hereinafter, whenever the elevator 13 is in the uppermost position U and one of an article 11 depresses the switch actuator 44, a circuit is conditioned to initiate operation of the air cylinder 36 so as to lower the platform 31.

In the event that the elevator 13 were to be lowered immediately after the actuation of the limit switch 43, it might sometimes happen that one or more articles 11—11 would already be on the main conveyor 12 in a position where it would interfere with the transfer operation; that is, such potentially interfering articles might either be directly under the elevator platform 31 or might be approaching the elevator position so closely as to be under the elevator platform 31 when it descends to the lowermost position L. In order to avoid conflict between the articles 11—11 and the elevator platform 31, and possible damage to either, a second control device is provided, which is responsive to the presence of such potentially interfering articles on the main conveyor 12, for precluding the operation of the cylinder 36 to lower the elevator 13 until after all such potentially interfering articles have passed the elevator.

One such control device is indicated in FIGS. 1 and 2, and includes a group of four additional limit switches designated generally by the numerals 51, 52, 53 and 54. These switches are provided with normally closed contacts 51–a, 52–a, 53–a and 54–a (FIG. 8), while the last switch 54 along the line of advancement of the articles 11—11 is also provided with a normally open contact 54–b. These switches are spaced along the main conveyor 12 under and on both sides of the elevator 13 so as to be actuated by the articles 11—11 whenever an article is present on the main conveyor 12 above the particular switch. The article-sensitive switches 51 to 54 are spaced more closely than the length of the articles 11—11 so that one or more of these switches is actuated whenever an article is in potentially interfering relationship with respect to the elevator 13.

The switches 51 to 54 are all similiar in construction and include, as viewed in FIG. 6 with respect to the switch 51, a pivoted actuator arm 56 that is mounted between two main conveyor rolls 21—21 so that the upper surface of the arm 56 extends above the upper surface of the rolls 21—21. With this construction, the arm 56 is pivoted downward whenever one of the articles 11—11 is passing thereover so as to open the associated contact 51–a (or, similarly, to open the contacts 52–a, 53–a and 54–a and close the contact 54–b). As indicated in FIG. 1, and in another connection in FIG. 7, the belt 22 engages only a central portion of the conveyor rolls 21—21, whereby the switches 51 to 54 may be located to one side of the belt 22 so as to engage the articles 11—11 but so as not to interfere with the belt 22.

The limit switches 51 to 54 are provided primarily to sense the presence of articles 11—11 on the main conveyor 12 which would lie under the elevator 13 were it to descend as soon as an article 11 is received thereon. However, it is also possible that there might be articles further back on the main conveyor 12 (to the right in FIG. 2) which would interfere with the elevator 13 during the transfer operation by advancing over the elevator platform 31 while that platform dwells in the lowermost position until the article 11 is completely transferred therefrom. It would be possible to provide several additional limit switches, similar to the switches 51 to 54 but further back on the conveyor 12, to solve this problem; however, it is preferred to provide a stopping mechanism, designated generally by the numeral 60, for precluding the advancement of any such additional article 11 along the main conveyor 12 beyond a point where it would interfere with the elevator 13 during the transfer operation.

One highly suitable stopping mechanism 60 in accordance with the invention is illustrated as to construction in FIG. 7 and as to position in FIGS. 1 and 2. The stopping mechanism 60 includes at least one stopping rod, preferably a pair of stopping rods 61—61 which are positioned between two adjacent main conveyor rolls 21—21 on opposite sides of the belt. The stopping rods 61—61 are located along the line of advancement of the articles 11—11 prior to the limit switch 51, which location is well prior to the location of the elevator 13.

The stopping rods 61—61 are received at the upper ends of a pair of tubular shafts 62—62, and a pair of compression springs 63—63 are received in the shafts 62—62 for biasing the rods 61—61 upward to protruding positions with respect to the shafts 62—62. The tubular shafts 62—62 are reciprocable within a pair of stationary mounting bushings 64—64 and are secured at their lower ends to a crossbar 66 for movement by an air cylinder designated generally by the numeral 67. The air cylinder 67 is designed for moving the shafts 62—62 between retracted positions (FIG. 2) where the stopping rods 61—61 lie entirely below the upper surfaces of the main conveyor rolls 21—21 so as not to interfere with the advancement of articles 11—11 therealong and extended positions (FIG. 7) where those portions of the rods 61—61 which protrude from the shafts 62—62 extend above the upper surfaces of the main conveyor rolls 21—21 so as to stop the advancement of articles 11—11 along the main conveyor 12 beyond the location of the stopping mechanism 60. The compression springs 63—63 are provided so that, in the event that the shafts 62—62 are moved to the extended positions at a time when an article 11 overlies the stopping rods 61—61, the rods 61—61 will be depressed by the weight of the article 11 to noninterfering positions within the tubular shafts 62—62.

A third control device is provided, which is preferably actuated as soon as an article 11 is received on the elevator platform 31 at the start of a transfer operation, for operating the stopping rods 61—61 to the extended positions. In the specific embodiment illustrated, this third control device includes the contact 43–b of the limit switch 54 and also a normally open contact 68–a of an additional limit switch 68 that is actuated whenever the elevator 13 is in the uppermost position U. As viewed in FIG. 2, the limit switch 68 is stationarily mounted and is operated whenever the elevator 13 is in the uppermost position by an actuator arm 69 that is clamped to one of the sliding rods 32.

*Control Circuit and Operation*

Figure 8:
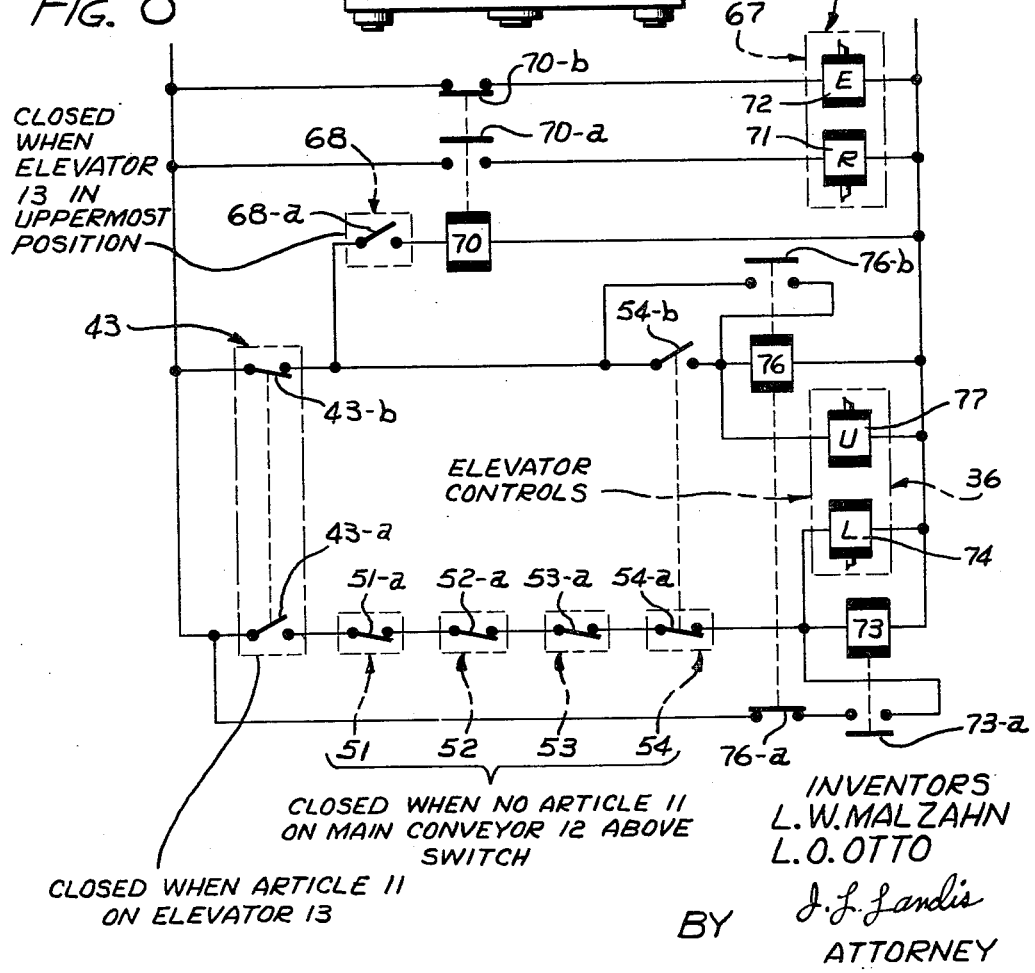
FIG. 8 is a schematic diagram of an electrical control circuit for operating various elements illustrated in the preceding drawings in accordance with the principles of the invention.

Assuming that relay-assembling or other manufacturing operations are proceeding normally at the work station 10 illustrated in FIG. 1, and that no article 11 has yet been placed on the gravity conveyor 14 for transfer to the main conveyor 12, a succession of the articles 11—11 advance at irregular intervals along the main conveyor 12 from preceding work stations 10—10 (not shown). The elevator 13 is in the uppermost or article-receiving position U ready to receive an article 11 from the work station 10, whereby the normally open contact 68–a of the switch 68 (FIG. 2) is closed. As illustrated in FIG. 8, when the contact 68–a is closed a first control relay 70 is energized through the contact 68–a and the normally closed contact 43–b of the limit switch 43 (FIG. 5). The contact 43–b is closed because no article 11 has yet been received on the elevator 13 for transfer to the main conveyor 12.

When the first control relay 70 is energized, a normally open contact 70–a thereof is closed so as to energize a solenoid valve 71, which is associated with the air cylinder 67 (FIG. 7) of the stopping mechanism 60 so as to retract the stopping rods 61—61 below the level of the main conveyor rolls 21—21 so that the rods 61—61 do not interfere with the advancement of articles 11—11 along the main conveyor 12. At the same time, a normally closed contact 70–b of the control relay 70 is opened so as to de-energize a solenoid valve 72 that controls the air cylinder 67 so as to extend the stopping rods 61—61.

Assuming now that an article 11 is placed on the gravity conveyor 14, that article passes down the gravity conveyor, over the elevator rolls 39—39, and finally comes to the rest position depicted in FIG. 3 atop the elevator platform 31 and against the stopping rod 40. When this occurs, the switch 43 is actuated so as to open the normally closed contact 43–b associated therewith. As the contact 43–b opens, the energization circuit for the control relay 70 is broken so as to energize the solenoid valve 72 and de-energize the solenoid valve 71, thus extending the stopping rods 61—61 to the stopping positions shown in FIG. 7 so as to preclude the advancement of any additional article along the main conveyor 12 beyond the stopping rods 61—61. In the event that an article 11 overlies the stopping rods 61—61 at the time that they are so extended, the stopping rods 61—61 are depressed by the weight of that article to noninterfering positions within the tubular shafts 62—62, against the action of the biasing springs 63—63. After such an article 11 has passed over the rods 61—61, they are extended by the action of the springs 63—63 to the stopping positions.

At the same time that the contact 43–b is opened, the normally open contact 43–a is closed so as to make possible the energization of a second control relay 73 and a solenoid valve 74 that is connected in parallel with the relay 73 and is associated with the air cylinder 36 (FIG. 2) so as to lower the elevator 13. In the event that there are no potentially interfering articles (as previously defined) already on the main conveyor 12 in the immediate vicinity of the elevator 13, the normally closed switch contacts 51–a, 52–a, 53–a and 54–a of the article-sensitive switches 51 (FIG. 6), 52, 53 and 54 are all closed, whereby the control relay 73 and the solenoid valve 74 are simultaneously energized as soon as the contact 43–a closes.

Otherwise, if an article is passing over any one of the switches 51, 52, 53 or 54, the associated contact 51–a, 52–a, 53–a or 54–a is open and the energization circuit for the control relay 73 and the solenoid valve 74 is not completed until such time after the contact 43–a has been closed as all of the contacts 51–a through 54–a are closed. Since the distance between each consecutive pair of the switches 51 through 54 is less than the length of the articles 11—11, the elevator 13 may not be lowered until there is no article 11 in the entire span between the switch 51 and the switch 54.

As soon as the second control relay 73 is thus energized, a normally open contact 73–a thereof is closed to complete a holding circuit for the relay 73 and the solenoid valve 74 around the contacts 43–a, 51–a, 52–a, 53–a and 54–a through the now closed contact 73–a and a normally closed contact 76–a of a third control relay 76, which is de-energized whenever the contact 43–b is open. When the solenoid valve 74 is energized, the elevator platform 31 is lowered to the lowermost or transfer position L shown in FIG. 2, in which position the upper surface of the platform 31 underlies the main conveyor rolls 21—21 and the stopping bar 40 is retracted, so that the article 11 is transferred to the main conveyor 12 and is advanced thereby to the left as viewed in FIG. 2.

As soon as the elevator platform 31 reaches the lowermost position L, the weight of the article 11 is transferred to the main conveyor 12 and the switch 43 is deactuated as to reopen the contact 43–a and reclose the contact 43–b. However, there is no immediate effect on the control circuit since the relay 73 and solenoid valve 74 are locked in through the contacts 73–a and 76–a and since the control relays 70 and 76 may not be again energized until the contacts 68–a and 54–b, respectively, are also closed in addition to the closure of the contact 43–b.

As soon as the transferred article 11 passes out from above the elevator platform 31 and also clears the last of the limit switches 54, the contact 54–b thereof closes. When both of the contacts 43–b and 54–b are thus closed, the third control relay 76 is energized as is a solenoid valve 77 that is connected in parallel with the relay 76 and is associated with the air cylinder 36 so as to raise the elevator platform 31 back to the uppermost position U.

When the third control relay 76 is energized, the contact 76–a is opened so as to break the holding circuit for the second control relay 73 and the solenoid valve 74, while a normally open contact 76–b thereof is closed so as to complete a holding circuit for the relay 76 and the solenoid valve 77 around the switch contact 54–b. In this manner, the relay 76 and the solenoid valve 77 will remain energized to maintain the elevator 13 in the uppermost position U until such time as the holding circuit is broken by the opening of the switch contact 43–b when an article 11 is again received on the elevator 13 for transfer to the main conveyor 12.

The stopping rods 61—61 remain extended to preclude the advancement of articles 11—11 into interfering proximity with the elevator 13 until such time as the elevator 13 comes to rest in the uppermost position U and again closes the switch contact 68–a. When this occurs, the first control relay 70 is re-energized through the contacts 43–b and 68–a to cause the previously closed contact 70–b to de-energize the stop-extending solenoid valve 72 and the previously open contact 70–a to re-energize the stop-retracting solenoid valve 71.

While one specific embodiment of the invention has been described in detail hereinabove, it will be obvious that various modifications may be made from the specific details described without departing from the spirit and scope of the invention.

What is claimed is:

1. Apparatus for loading and conveying articles, which comprises a conveyor having spaced driven rolls for advancing articles placed at irregular intervals therealong; an elevator having a platform designed for receiving the articles thereon, the platform being normally positioned above the conveyor rolls and having spaced apertures therealong which are larger than the conveyor rolls and are directly aligned thereabove; means for lowering said elevator from an uppermost receiving position to a lowermost transferring position where the apertures fit over the aligned conveyor rolls and the upper surface of the platform lies below the upper surfaces of the conveyor rolls, so that articles on the platform are deposited on the conveyor rolls for advancement thereby; and control means, responsive to the presence of any article that is already on said conveyor and is in a position approaching said elevator where it would otherwise interfere with the transfer operation, for precluding the operation of said elevator-lowering means until after all such potentially interfering articles on said main conveyor have passed said elevator.

2. Apparatus for loading and conveying articles, which comprises a conveyor having spaced driven rolls for advancing articles placed at irregular intervals therealong; an elevator having a platform designed for receiving the articles thereon, the platform being normally positioned above the conveyor rolls and having spaced apertures therealong which are larger than the conveyor rolls and are directly aligned thereabove; means for lowering said elevator from an uppermost receiving position to a lowermost transferring position where the apertures fit over the aligned conveyor rolls and the upper surface of the platform lies below the upper surfaces of the conveyor rolls, so that articles on the platform are deposited on the conveyor rolls for advancement thereby; stopping means for precluding the advancement of any additional article along said conveyor beyond a point where it would interfere with said elevator during the transfer operation, said stopping means being normally retracted so as not to interfere with the advancement of articles along said conveyor; and control means, actuated when an article is received on the platform prior to the start of a transfer operation, for operating said stopping means to an extended stopping position.

3. The apparatus as recited in claim 2, wherein the stopping means comprises a stopping rod movable in the space between two conveyor rolls in advance of the elevator, a tubular shaft for receiving said stopping rod at the upper end thereof, a compression spring received in said tubular shaft for biasing said stopping rod upward to a protruding position with respect to said tubular shaft, and means for moving said tubular shaft between a retracted position where said stopping rod lies entirely below the upper surfaces of the conveyor rolls and an extended position where that portion of said stopping rod which protrudes from said tubular shaft extends above the upper surfaces of the conveyor rolls so as to stop the advancement of articles therealong, said stopping rod being depressed by an article to a noninterfering position within said tubular shaft in the event that said tubular shaft is moved to the extended position at a time when an article overlies said stopping rod.

4. Apparatus for loading articles onto a conveyor having spaced driven rolls for advancing articles placed thereon, along which conveyor articles are already advancing at irregular intervals; which apparatus comprises an elevator having a platform designed for receiving the articles thereon, the platform being normally positioned above the conveyor rolls and having spaced apertures therealong which are larger than the conveyor rolls and are directly aligned thereabove; means for lowering said elevator from an uppermost receiving position to a lowermost transferring position where the apertures fit over the aligned conveyor rolls and the upper surface of the platform lies below the upper surfaces of the conveyor rolls, so that articles on the platform are deposited on the conveyor rolls for advancement thereby; first control means, actuated when an article is received on the platform, for initiating operation of said elevator-lowering means; second control means, responsive to the presence of any article that is already on the conveyor and is in a position where it would otherwise interfere with the transfer operation, for precluding the initiation of operation of said elevator-lowering means by said first control means until after all such potentially interfering articles on the conveyor have passed said elevator; stopping means for precluding the advancement of any additional article along the conveyor beyond a point where it would interfere with said elevator during the transfer operation, said stopping means being normally retracted so as not to interfere with the advancement of articles along the conveyor; and third control means, actuated when an article is received on the platform prior to the start of a transfer operation, for operating said stopping means to the extended position.

5. Apparatus for loading and conveying articles, which comprises a conveyor having spaced driven rolls for advancing articles placed thereon; an elevator having a platform designed for receiving the articles thereon, the platform being normally positioned above the conveyor rolls and having spaced apertures therealong which are larger than the conveyor rolls and are directly aligned thereabove; means for advancing articles onto the upper surface of the platform; means for stopping the articles in a rest position on the upper surface of the platform; means for lowering said elevator from an uppermost receiving position to a lowermost transferring position where the apertures fit over the aligned conveyor rolls and the upper surface of the platform lies below the upper surfaces of the conveyor rolls, so that articles on the platform are deposited on the conveyor rolls for advancement thereby; and means for disengaging said stopping means as said elevator moves to the lowermost position.

6. Apparatus for transferring and conveying articles from a plurality of work stations, which comprises a continuously-running main conveyor having spaced driven rolls that pass below all of the work stations; an elevator associated with each work station and having a platform with spaced apertures therealong which are larger than and aligned above the conveyor rolls; means for raising each elevator to an uppermost position where the platform is so positioned as to receive articles from the associated work station; means, operable after an article has been received on the associated elevator, for lowering that elevator to a lowermost position with the platform below the level of the main conveyor where the elevator is so positioned that an article thereon is automatically transferred to said main conveyor for advancement thereby; control means, responsive to the presence of any article that is already on said main conveyor and is approaching a position where it would otherwise interfere with any transfer operation, for precluding the operation of the associated elevator-lowering means until all such potentially interfering articles on said main conveyor have passed the associated elevator; and stopping means for precluding the advancement of any additional article along said main conveyor beyond a point where it would interfere with an associated elevator during a transfer operation.

7. Apparatus for transferring articles from a plurality of work stations to a continuously-running main conveyor that passes below all of the work stations, which apparatus comprises an elevator associated with each work station; means for raising each elevator to an uppermost position where it is so positioned as to receive articles from the associated work station; a gravity conveyor connecting each work station to the associated elevator so as to feed articles placed on the gravity conveyor to rest positions on the associated elevators; means for lowering each elevator to a lowermost position below the level of the main conveyor where the elevator is so positioned that an article thereon is automatically transferred to the main conveyor for advancement thereby; first switching means, responsive to the feeding of an article onto an elevator from the associated gravity conveyor, for initiating operation of the associated elevator-lowering means; a group of second switching means, spaced along the main conveyor and responsive to the presence of any article that is already on the main conveyor and is in a position where it would otherwise interfere with any transfer operation, for precluding the operation of the associated elevator-lowering means until all such potentially interfering articles on the main conveyor have passed the associated elevator; a group of stopping rods located along the main conveyor, said stopping rods being normally retracted but being extensible to preclude the advancement of any additional article along the main conveyor to a point where it would interfere with an associated elevator during a transfer operation; third switching means, associated with each elevator and responsive to the reception of an article on the associated elevator, for extending the associated stopping rods; fourth switching means, responsive to the complete disengagement of an article from an associated elevator at the end of a transfer operation, for actuating the associated elevator-raising means to return the elevator to the uppermost position; and fifth switching means, responsive to the return of an associated elevator to the uppermost position, for retracting the associated stopping rod to its normal position where it does not interfere with the advancement of articles along the main conveyor.

References Cited in the file of this patent
UNITED STATES PATENTS

| 1,669,497 | Steegmuller | May 15, 1928 |
| 2,306,101 | Van Zandt | Dec. 22, 1942 |
| 2,548,767 | Brest | Apr. 10, 1951 |
| 2,667,982 | Evans | Feb. 2, 1954 |
| 2,761,545 | Hoagland | Sept. 4, 1956 |
| 2,812,080 | Campos | Nov. 5, 1957 |